(12) United States Patent
Adane et al.

(10) Patent No.: US 9,057,404 B2
(45) Date of Patent: Jun. 16, 2015

(54) CAGE FOR A ROLLING BEARING, NOTABLY FOR A MOTOR VEHICLE ELECTRIC POWER STEERING BEARING

(71) Applicants: Thierry Adane, Tours (FR); Thomas Perrotin, Saint Roch (FR); Laurent Varnoux, Saint Avertin (FR)

(72) Inventors: Thierry Adane, Tours (FR); Thomas Perrotin, Saint Roch (FR); Laurent Varnoux, Saint Avertin (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 13/973,679

(22) Filed: Aug. 22, 2013

(65) Prior Publication Data

US 2014/0054102 A1    Feb. 27, 2014

(30) Foreign Application Priority Data

Aug. 22, 2012  (FR) ..................... 12 57937

(51) Int. Cl.
| F16C 33/41 | (2006.01) |
| F16C 33/38 | (2006.01) |
| F16C 33/66 | (2006.01) |
| F16C 19/06 | (2006.01) |

(52) U.S. Cl.
CPC ......... *F16C 33/3887* (2013.01); *F16C 2326/24* (2013.01); *F16C 33/6614* (2013.01); *F16C 19/06* (2013.01); *F16C 33/416* (2013.01); *F16C 33/418* (2013.01)

(58) Field of Classification Search
CPC .............. F16C 33/3887; F16C 33/467; F16C 33/6614; F16C 19/06; F16C 33/416; F16C 33/418; F16C 2326/24
USPC .................. 384/513, 516, 523, 527, 531–534
See application file for complete search history.

(56) References Cited

U.S. PATENT DOCUMENTS

| 7,044,645 B2 * | 5/2006 | Yamamoto .................... 384/531 |
| 2011/0229312 A1 * | 9/2011 | Frank ......................... 415/170.1 |

FOREIGN PATENT DOCUMENTS

| DE | 102006015547 | * | 5/2006 |
| DE | 102007034091 A1 | | 1/2009 |
| EP | 2546536 A1 | | 1/2013 |
| FR | 2883941 A1 | | 10/2006 |
| FR | 2898676 A1 | | 9/2007 |
| FR | 2911934 A1 | | 8/2008 |
| JP | 2003287032 A | | 10/2003 |
| WO | 2011111729 A1 | | 9/2011 |

OTHER PUBLICATIONS

Translation of de102006015547 obtained May 20, 2014.*
Translation of de102007034091 obtained May 20, 2014.*

* cited by examiner

*Primary Examiner* — James Pilkington
(74) *Attorney, Agent, or Firm* — Bryan Peckjian; SKF USA Inc. Patent Dept.

(57) ABSTRACT

A rolling bearing cage provides a circumferential spacing of a row of rolling elements and comprises first pockets configured to accommodate first rolling elements of the row of rolling elements. The first pockets are provided with axial retention portions configured to retain the rolling bearing cage on the first rolling elements. Second pockets are configured to accommodate second rolling elements of the row of rolling elements and not provided with axial retention portions configured to retain the cage on the second rolling elements. Separation portions are provided which between the separation portions delimit the first and second pockets. Each of the separation portions delimiting one of the first pockets comprises a notch open in an axial direction and open in opposing radial directions.

12 Claims, 4 Drawing Sheets

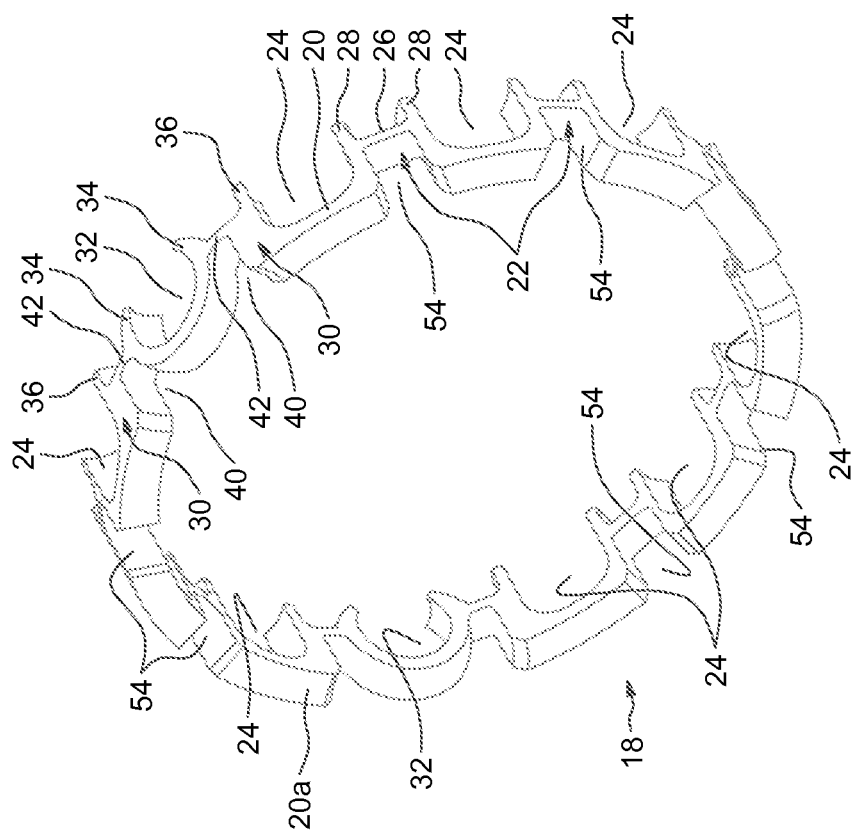

CAGE FOR A ROLLING BEARING, NOTABLY FOR A MOTOR VEHICLE ELECTRIC POWER STEERING BEARING

CROSS-REFERENCE TO RELATED APPLICATIONS

This application is a United States Non-Provisional Utility Patent Application claiming the benefit of French Patent Application Number 1257937 filed on Aug. 22, 2012, which is incorporated herein in its entirety.

FIELD OF THE INVENTION

The present invention relates to the field of rolling bearings, notably rolling bearings used in motor vehicle electric power steering systems. The invention relates more particularly to the retaining cages that provide the circumferential spacing between the rolling elements of the rolling bearings.

BACKGROUND OF THE INVENTION

A motor vehicle electric power steering generally comprises an electromechanical actuator situated on the steering column or on the lower assembly which comprises mechanical components intended to perform the angular positioning of the steered wheels of the vehicle. The electromechanical actuator comprises a rotary electric motor the shaft of which is supported by at least one rolling bearing, either directly or via a ball-screw system.

The rolling bearing generally comprises an inner ring, an outer ring and a row of rolling elements, generally balls, arranged between the rings.

A retaining cage for a rolling bearing comprising a plurality of pockets for housing balls each of which is defined in part by two claws arranged on the opposite side to a heal of the cage is known from document FR-A1-2 911 934. Such cages are completely satisfactory in a great many applications. However, in applications involving a low rotational speed, or in applications in which the direction of rotation reverses sharply, this kind of cage runs into various difficulties. Specifically, under the effects of the balls, the cage may suffer extensive deformation and come into contact with the inner ring, causing it to become damaged or even destroyed.

In addition, when the direction in which the load is applied to the bearings changes, for example when the wheels of a vehicle equipped with an electric power steering as described above are turned as the driver manoeuvres to the left and to the right when parking the vehicle, the cage is likewise severely deformed, or even destroyed. Moreover, it may prove difficult to fit such a cage over the balls.

A cage for a rolling bearing and comprising first pockets for the balls provided with axial retention claws for retaining the cage on the balls, and second pockets not provided with axial retention claws and dimensioned so that the associated balls are offered a relatively large degree of play so that they can move radially and circumferentially with respect to the second pockets is also known, from document FR-A1-2 883 941.

With such a cage, the interaction between the balls housed in the second pockets and the cage is reduced. In addition, the balls are able to move relative to one another, limiting the risk of deformation in the event of antagonistic movements of two adjacent balls. Moreover, it is easier to fit the cage over the balls in so far as only part of the pockets is equipped with the axial retention claws.

However, clipping the claws onto the balls when fitting the cage may cause small cracks to appear on the cage, and this may cause more rapid deterioration in service.

One aim of the present invention is to overcome these drawbacks.

More particularly, the present invention seeks to provide a cage for a rolling bearing that is easy to fit and that offers good reliability.

The present invention also seeks to provide a cage of small size, limited weight and which is not very deformable in service.

In one embodiment, the rolling bearing cage intended to provide the circumferential spacing of a row of rolling elements comprises first pockets for first rolling elements of the row, these pockets being provided with axial retention means for retaining the cage on the rolling elements, second pockets for second rolling elements of the row and not provided with axial retention means for retaining the cage on the rolling elements, and separation portions which between them delimit first and second pockets. Each separation portion delimiting one of the first pockets comprises a notch which is open axially and opens radially onto each side of the separation portion.

Advantageously, the notch leaves remaining at the separation portion a tab connected to the wall of the associated first pocket.

In one embodiment, the notch is open axially on the opposite side to the pockets.

The cage may comprise an axial portion from which the separation portions project. The notches of the separation portions may be open axially in the direction of an end face of the axial portion which is on the opposite side to the axial retention means.

In one embodiment, the first pockets comprise a spherical wall of constant thickness.

Each separation portion delimiting one of the first pockets may comprise a claw extending circumferentially towards the claw of the adjacent separation portion and forming the axial retention means.

In one embodiment, the separation portions delimiting the second pockets each comprise a cavity open axially on the opposite side to the pockets and radially towards the inside. Alternatively, or as a combination, the separation portions each comprise a cavity open axially on the opposite side to the pockets and radially towards the outside.

In another embodiment, each separation portion delimiting one of the second pockets comprises a cavity open axially on the opposite side to the pockets and opening radially on each side of the separation portion.

Each separation portion delimiting one of the second pockets may comprise a notch open axially on the same side as the pockets and opening radially on each side of the separation portion. The second pockets may have substantially cylindrical lateral walls.

The cage may, for example, be made as a single piece in a synthetic material, preferably, in a polymer material.

A second aspect of the invention relates to a rolling bearing comprising an outer ring, an inner ring, at least one row of rolling elements which are arranged between the rings, and a cage as defined hereinabove.

A third aspect of the invention relates to a motor vehicle electric power steering comprising at least one rolling bearing as defined hereinabove.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF THE INVENTION

Figure 1:
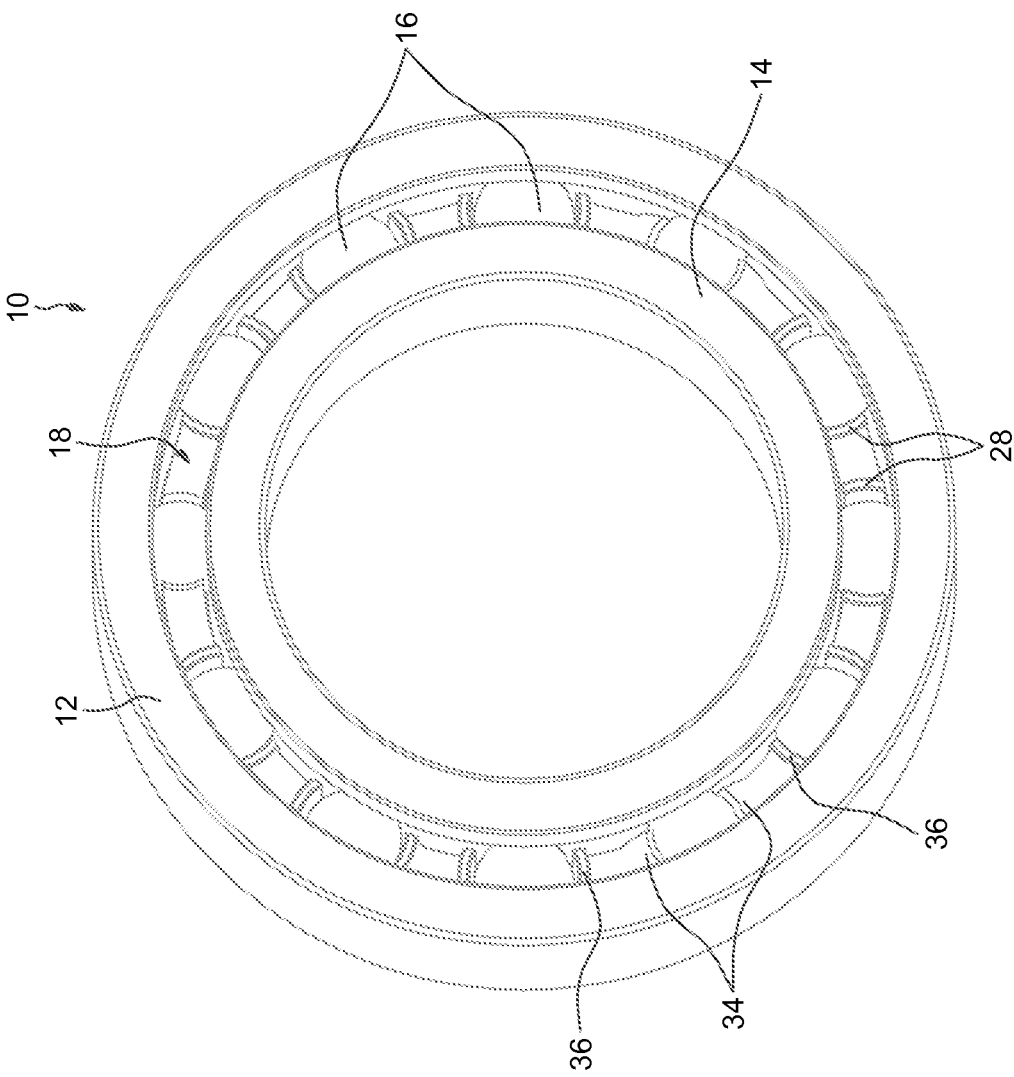
FIG. 1 is a perspective view of a rolling bearing according to a first example of the invention.

As can be seen in FIG. 1, the rolling bearing 10 comprises an outer ring 12, an inner ring 14, a plurality of rolling elements 16, here produced in the form of balls, and a cage 18 that maintains an even circumferential spacing of the rolling elements. The outer ring 12 and inner ring 14 are solid. What is meant by a "solid ring," is a ring the shape of which is obtained by machining with the removal of chips (turning, grinding) from tubes, bar stock, forged and/or rolled blanks.

The outer ring 12 comprises, in the region of its bore, a deep groove raceway which, in cross section, has a concave internal profile tailored to the rolling element 16, the raceway facing radially inwards. The inner ring 14 also comprises, in its cylindrical exterior surface, a deep groove raceway which, in cross section, has a concave internal profile tailored to the rolling elements 16, the raceway facing radially outwards. The cage 18 is arranged radially between the outer surface of the inner ring 14 and the bore of the outer ring 12.

Figure 2:
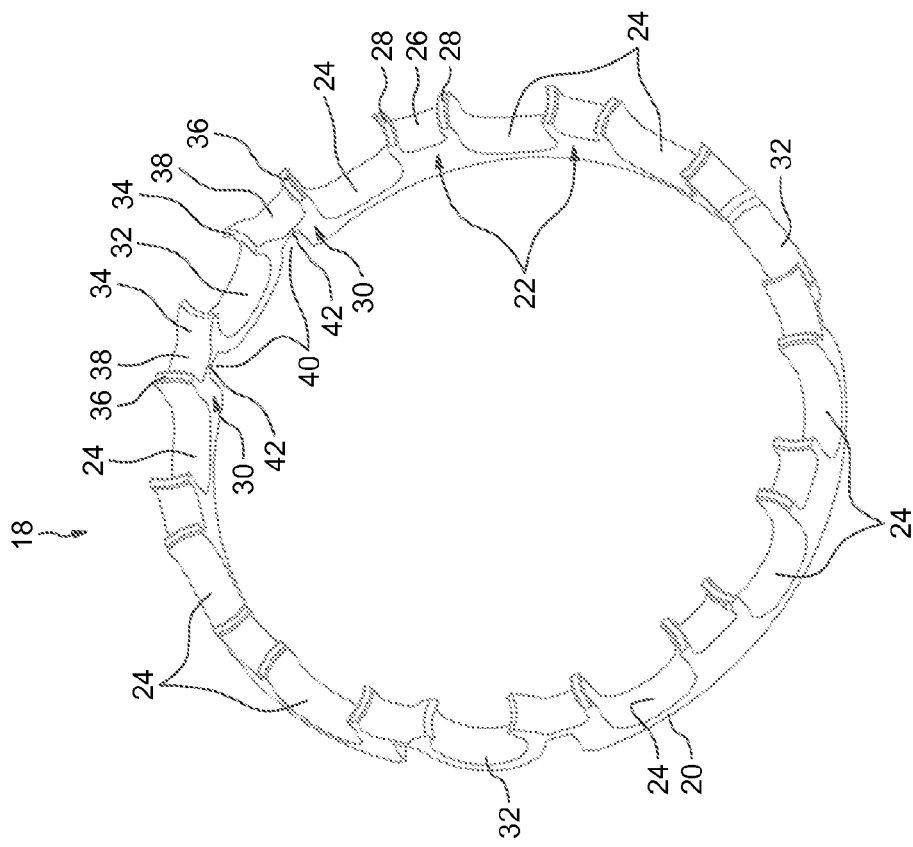
FIGS. 2 and 3 are perspective views of the cage of the bearing of FIG. 1, and FIGS. 4 to 6 are perspective views of a cage according to second, third and fourth exemplary examples of the invention.
Figure 3:
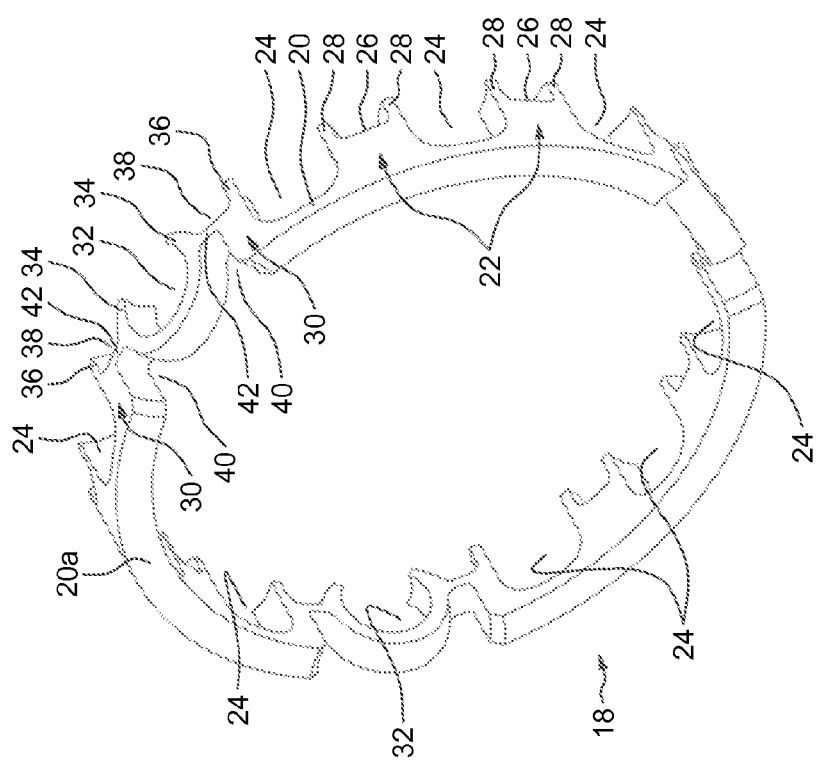

As illustrated more visibly in FIGS. 2 and 3, the cage 18 comprises an annular axial portion 20 designed to be arranged axially on one side of the rolling elements and forming a heel, and separation portions 22 or separation fingers extending axially from the axial portion 20 on the opposite side to a radial end face 20a of the portion. The separation portions 22 are of one piece with the axial portion 20 and between them delimit pockets 24 in which the rolling elements are arranged.

The separation portions 22 take the form of pegs projecting axially from the axial portion 20, the portions being delimited radially by an inner surface aligned with the bore of the axial portion 20 and by an outer surface aligned with the outer surface of the axial portion. The separation portions 22 are delimited in the circumferential direction by substantially cylindrical axial lateral walls which define the pockets 24. The diameter of the cylinder defining the walls of each pocket 24 is greater than that of the rolling elements so that the rolling elements can be offered some clearance to move radially and circumferentially with respect to the pockets 24. Each pocket 24 is open radially towards the inside and towards the outside and open axially on the opposite side to the axial portion 20 in order to allow the cage 18 to be fitted. The pockets 24 have an axial opening provided with cylindrical edges or walls so as to reduce the friction of the rolling elements rubbing against the cage.

Each separation portion 22 comprises a notch 26 formed at its free end and open axially on the opposite side to the axial portion 20. The notches 26 open radially towards the inside and towards the outside of the cage. In other words, each notch 26 opens radially on each side of the associated separation portion 22. Each notch 26 delimits on the associated separation portion 22 two axial protrusions 28 of substantially cylindrical shape which are situated axially on the opposite side from the axial portion 20 and which axially extend the lateral walls of the separation portion. The protrusions 28 are not suitable for providing axial retention of the cage on the rolling elements. The pockets 24 are not provided with such axial retention means.

The cage 18 also comprises the hybrid separation portions 30 defining pockets 32 provided with axial retention means for retaining the cage on the rolling elements. As will be described hereinafter, the hybrid separation portions 30 have a hollowed structure to promote the flexibility of the pockets 32.

In the embodiment illustrated, the cage 18 comprises six hybrid separation portions 30 which in pairs define three pockets 32, whereas the pockets 24 are nine in number and the separation portions 22 are six in number. The pockets 32 have a spherical overall shape that tends to envelop the associated rolling elements. The pockets 32 are evenly distributed in the circumferential direction in order to provide even axial retention of the cage 18 on the rolling elements.

The hybrid separation portions 30 take the form of fingers or pegs projecting axially from the axial portion 20 and are delimited radially by inner and outer surfaces respectively aligned with the bore and with the outer surface of the axial portion 20. Each hybrid separation finger 30 has, on one side in the circumferential direction, a substantially cylindrical lateral wall so that with an adjacent separation portion 22 it forms one of the pockets 24 adjacent to the pocket 32, and on the other side has a spherical wall which connects with the spherical wall of the adjacent hybrid separation portion 30 to form the actual pocket 32 proper. The wall of each pocket 32 is spherical and forms a cup of constant thickness to accommodate the associated rolling element. This means that pockets 32 offering good flexibility can be obtained.

Each separation finger 30 comprises a claw 34 extending axially on the opposite side to the axial portion 20 and the free end of which extends in the circumferential direction towards the opposite claw 34 of the adjacent hybrid separation portion 30 to delimit the same pocket 32. The concave inner surface of each claw 34 forms part of the spherical wall of the pocket 32. The two claws 34 associated with a pocket 32 extend towards one another, their free ends being spaced apart by a distance that is smaller than the diameter of the rolling elements. The claws 34 of a pocket are capable of axially retaining the cage 18 by clipping onto the rolling element arranged in the pocket. The cage 18 is retained axially on the row of rolling elements by the claws 34.

Each hybrid separation portion 30 also comprises an axial protrusion 36 of cylindrical shape extending axially in the opposite direction from the axial portion 20. The protrusion 36 of each hybrid separation portion 30 delimits, in part, with the protrusions 28 of the adjacent separation portion 22, one of the pockets 24 that is not provided with axial retention means. Each protrusion 36 is unable to provide axial retention of the cage with respect to the rolling element arranged in the pocket 24 adjacent to the pocket 32.

The claw 34 and the protrusion 36 of each hybrid separation portion 30 are separated in the circumferential direction by a cavity 38 so that the claw 34 has a relatively small circumferential thickness and a certain degree of flexibility allowing the cage 18 to be clipped onto the rolling elements via a circumferential parting of the claws 34 when axial thrust is applied on the axial portion 20 of the cage in the direction of the rolling elements. Each cavity 38 is formed at the free end of the associated hybrid separation portion 30 and is open axially on the opposite side to the axial portion 20. Each cavity 38 extends axially towards the end face 20a and opens radially towards the inside and towards the outside of the cage. In other words, each cavity 38 opens radially on each side of the associated hybrid separation portion 30. Each pocket 32 is open radially towards the inside and towards the outside and is also open axially on the opposite side to the axial portion 20 so as to allow the cage 18 to be installed.

Each hybrid separation portion 30 further comprises a notch 40 extending axially from the end face 20a of the axial portion. The notch 40 extends axially up to close to the cavity 38 formed between the claw 34 and the protrusion 36 leaving remaining axially between them a tab 42 of small thickness which connects to the spherical wall of the associated pocket 32. The notch 40 of rectangular overall shape is situated axially in the continuation of the cavity 38. The notch 40 is open axially on the opposite side to the pockets 24, 32. The notch 40 opens radially on each side of the associated separation portion 30. The notch 40 opens radially towards the inside in the bore of the axial portion 20 of the cage and radially towards the outside at the outer surface of the separation finger. The open-ended notch 40 passes through the thickness of the separation portion 30. The notch 40 is delimited in the circumferential direction by the hybrid separation portion 30 and by the spherical wall of the pocket 32. The notch 40 is situated in the circumferential direction between the pocket 32 and the adjacent pocket 24.

The adjacent hybrid separation portions 30 between them defining one of the pockets 32 comprise, on each side of the pocket, two notches 40 which are open axially towards the end face 20a of the axial portion and radially on the inside and on the outside, and two flexible tabs 42 delimited by the notches. Each pocket 42 is axially offset toward the end face 20a of the axial portion with respect to the claw 34. The notches 40 form, on the cage 18, zones in which the mechanical strength of the cage is locally weakened to encourage deformation of the tabs 42 axially on the side of the axial portion 20 and flexibility of the pocket 32. Further, the notches 40 form cavities which lighten the cage 18 by reducing the amount of material used. The cage 18 is advantageously made as a single piece by moulding a polymer material such as polyamide for example, notably PA 66 or PA 46, or alternatively a polyetheretherketone (PEEK).

Figure 4:
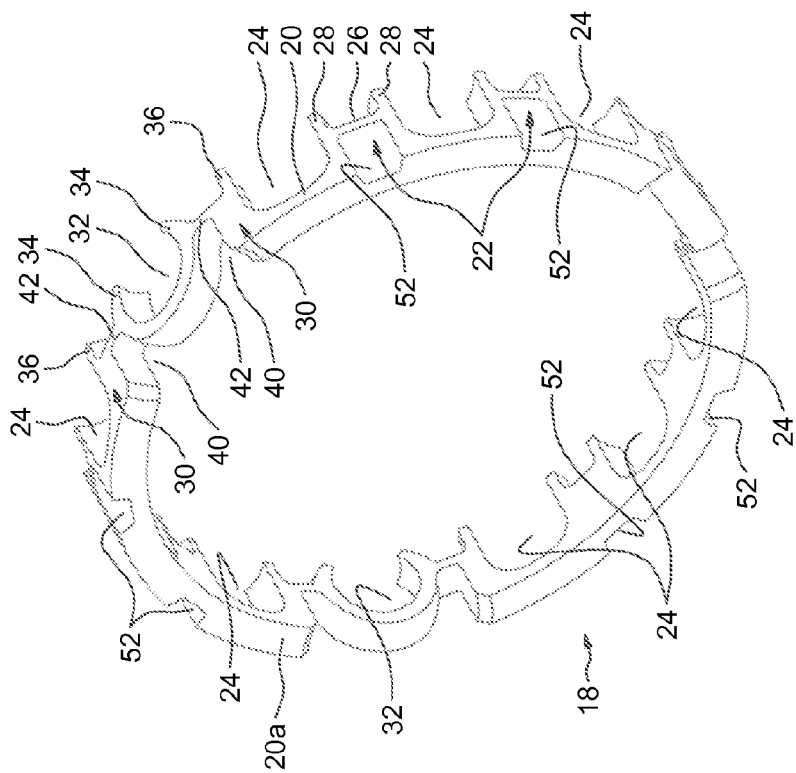

The alternative form of embodiment illustrated in FIG. 4, in which identical elements bear the same references, differs only in that each separation portion 22 of the cage comprises, on its inner surface, a cavity 50 extending axially from the end face 20a of the axial portion into the vicinity of the notch 26. The cavity 50 is open axially on the opposite side to the pockets 24 and 32 towards the end face 20a, opens radially towards the inside into the bore of the axial portion of the cage, and is delimited radially towards the outside by the separation portion 22. Each cavity 50 is of rectangular overall shape.

Figure 5:
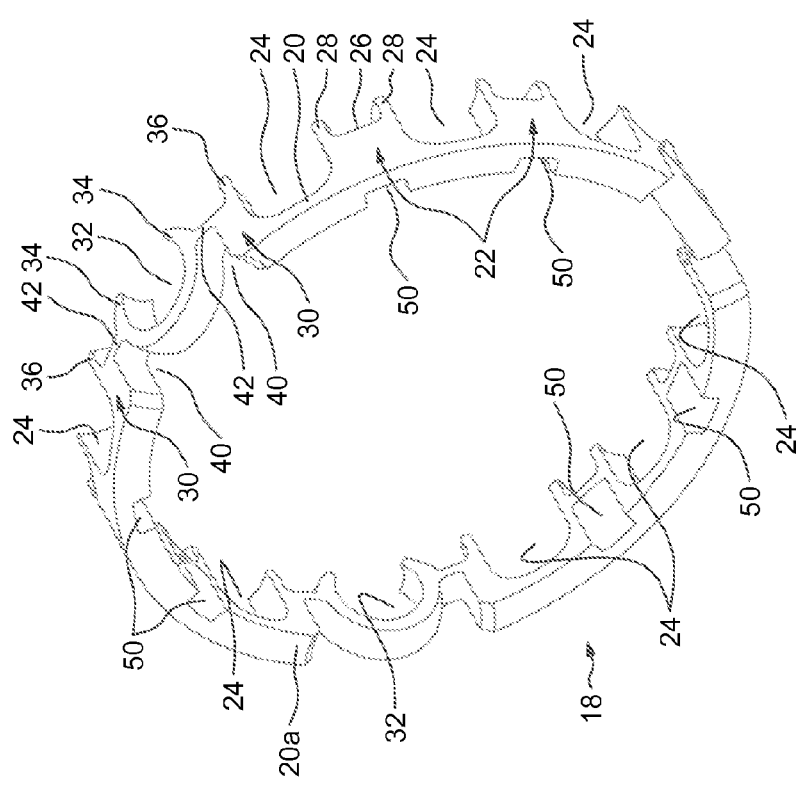

As an alternative, as illustrated in FIG. 5, in which identical elements bear the same references, each separation portion 22 of the cage comprises, on its outer surface, a cavity 52 extending axially from the end face 20a of the axial portion into the vicinity of the notch 26. The cavity 52 is open axially on the opposite side to the pockets 24 and 32, opens radially towards the outside and is delimited radially towards the inside by the separation portion 22. Each cavity 52 is of rectangular overall shape.

In another alternative form of embodiment illustrated in FIG. 6, in which identical elements bear the same references, each separation portion 22 of the cage comprises a cavity 54 extending axially from the end face 20a of the axial portion into the vicinity of the notch 26. The cavity 54 is open axially on the opposite side to the pockets 24 and 32 and opens radially towards the inside into the bore of the axial portion 20 of the cage and radially towards the outside in the region of the outer surface of the separation finger. Each cavity 54 is of rectangular overall shape.

By virtue of the invention, the cage pockets equipped with the means of retention on or of clipping onto the rolling elements have greater flexibility in the axial direction, making it possible to avoid the appearance of cracks when the cage is fitted onto the rolling elements by axial thrust. The notches allow the flexibility of the cage to be locally increased.

The invention claimed is:

1. A rolling bearing cage, for providing circumferential spacing of a row of rolling elements, comprising:
    first pockets configured to accommodate first rolling elements of the row of rolling elements, the first pockets being provided with axial retention portions configured to retain the rolling bearing cage on the first rolling elements;
    second pockets configured to accommodate second rolling elements of the row of rolling elements, the second pockets not being provided with axial retention portions configured to retain the rolling bearing cage on the second rolling elements;
    first separation portions, which between the first separation portions, delimit the first pockets; and
    second separation portions, which between the second separation portions, delimit the second pockets,
    wherein each of the first separation portions comprises a first notch open in an axial direction and open in opposing radial directions,
    wherein each of the second separation portions comprises a second notch open in an axial direction the same as an axial direction that the first and second pockets open, and
    wherein the second notch is open in opposing radial directions.

2. The rolling bearing cage according to claim 1, wherein the first notch leaves, remaining at the first separation portion, a tab connected to a wall of an associated first pocket of the first pockets.

3. The rolling bearing cage according to claim 1, wherein the first notch is open in an axial direction opposite to the axial direction that the first and second pockets are open.

4. The rolling bearing cage according to claim 1 further comprising:
    an axial portion from which the first and second separation portions project.

5. The rolling bearing cage according to claim 4, wherein the first notch is open in an axial direction opposite the axial direction that the first pockets are open.

6. The rolling bearing cage according to claim 1, wherein the first pockets each comprise a portion of a spherical wall of constant radial thickness relative to an axis of each of the first pockets, the axis of each of the first pockets being perpendicular to an axis of the rolling bearing cage.

7. The rolling bearing cage according to claim 1, wherein each of the axial retention portions comprises a pair of claws spaced from and extending circumferentially towards one another.

8. The rolling bearing cage according to claim 1, wherein the second separation portions each comprise a cavity open in an axial direction opposite to the axial direction that the first and second pockets are open and in a radial direction towards an inside of the rolling bearing cage.

9. The rolling bearing cage according to claim 1, wherein the second separation portions each comprise a cavity open in the axial direction opposite to an axial direction that the first and second pockets are open and in a radial direction towards an outside of the rolling bearing cage.

10. The rolling bearing cage according to claim 1, wherein each of the second separation portions comprises a cavity open in an axial direction opposite to the axial direction that the first and second pockets are open, and wherein the cavity is open in opposing radial directions.

11. The rolling bearing cage according to claim 1, wherein the second pockets have substantially cylindrical lateral walls.

12. A rolling bearing comprising:
an inner ring;
an outer ring;
at least one row of rolling elements arranged between the inner and outer rings; and
the roller bearing cage according to claim 1 circumferentially spacing a row of the at least one row of rolling elements.

* * * * *